United States Patent
Pilato

(10) Patent No.: US 7,962,389 B1
(45) Date of Patent: *Jun. 14, 2011

(54) METHOD AND SYSTEM FOR PROVIDING FINANCIAL FUNCTIONS

(75) Inventor: Alejandro M. Pilato, London (GB)

(73) Assignee: TradeRisks, Inc., Dover, DE (US)

( * ) Notice: Subject to any disclaimer, the term of this patent is extended or adjusted under 35 U.S.C. 154(b) by 74 days.

This patent is subject to a terminal disclaimer.

(21) Appl. No.: 12/137,602

(22) Filed: Jun. 12, 2008

Related U.S. Application Data

(63) Continuation of application No. 09/650,733, filed on Aug. 30, 2000, now Pat. No. 7,395,232.

(51) Int. Cl.
 *G06Q 40/00* (2006.01)
(52) U.S. Cl. .......................................................... 705/35
(58) Field of Classification Search .................. None
 See application file for complete search history.

(56) References Cited

U.S. PATENT DOCUMENTS 5,644,727 A * 7/1997 Atkins ............................ 705/40
5,684,952 A * 11/1997 Stein ............................. 709/221

OTHER PUBLICATIONS

Periphonics Introduces ScreenSentry, a CTI Client that Provides a Complete View of Call Center Agents' Performance. Business Editors Computer Telephony Expo. Business Wire. Sep. 15, 1999. p. 1.*

* cited by examiner

*Primary Examiner* — Jason M Borlinghaus
(74) *Attorney, Agent, or Firm* — Michael Haynes PLC; Michael N. Haynes

(57) ABSTRACT

A method is disclosed for providing financial functions by an agent for each of a plurality of clients. One embodiment includes, relating to a financial function of each client, demonstrating that more than one activity of the agent can be transparent to the client, receiving financial information at the agent, creating risk management information relating to the financial information, analyzing the risk management information in the context of the financial information, determining an action based on the analysis, facilitating implementation of an action on behalf of the client, and communicating with the client one or more activities of the agent.

20 Claims, 3 Drawing Sheets

METHOD AND SYSTEM FOR PROVIDING FINANCIAL FUNCTIONS

FIELD OF THE INVENTION

The present invention relates to the field of financial risk management and trading, and, more particularly, to a method and system for clients to outsource financial functions to an agent.

BRIEF DESCRIPTION OF THE DRAWINGS

The invention will be more readily understood through the following detailed description, with reference to the accompanying drawings, in which.

DETAILED DESCRIPTION

Overview

Figure 1:
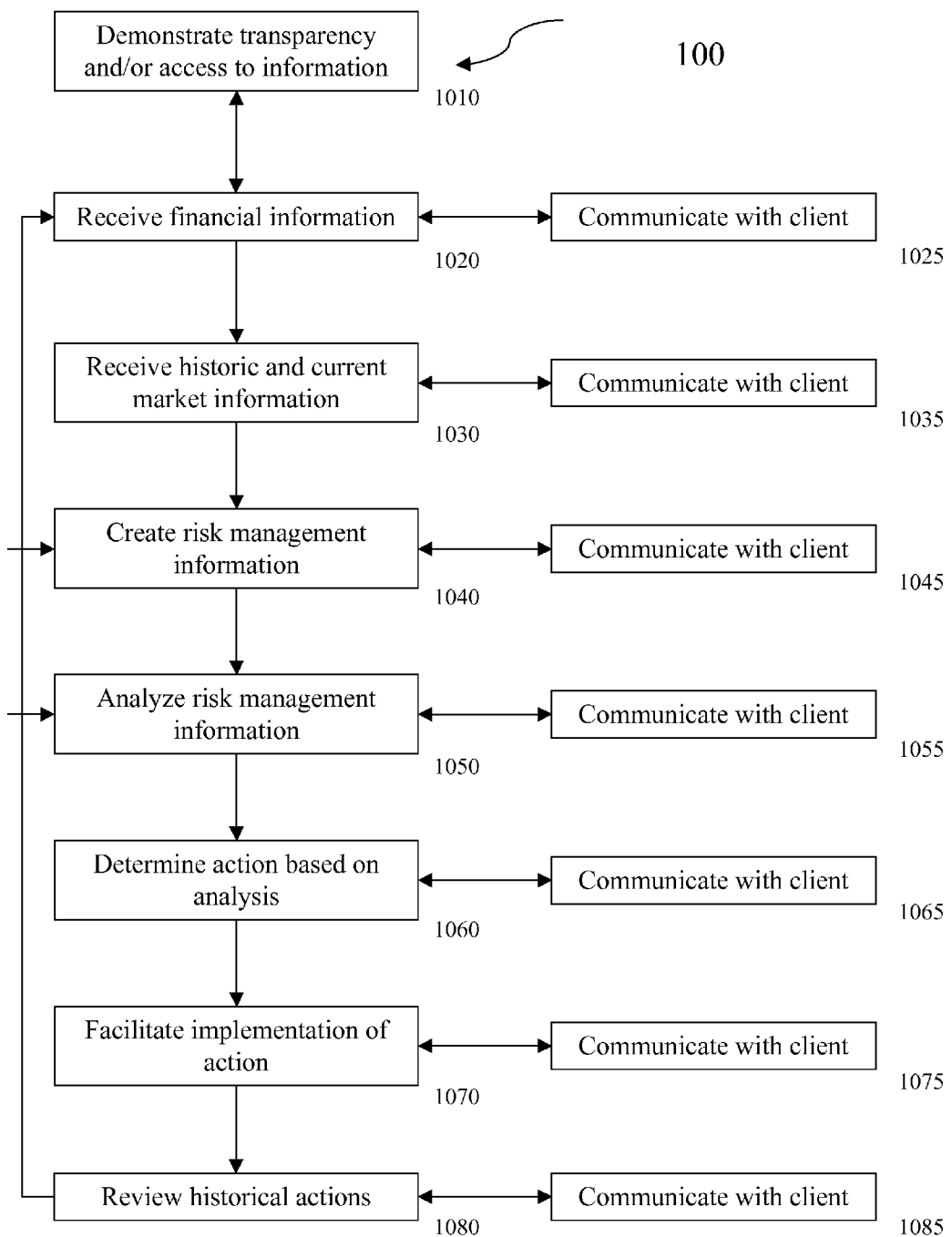
FIG. 1 is a flowchart of an embodiment of a method 100 of the present invention.

Shareholders tend to increasingly demand that issuers focus on their core functions. Such focus is believed to increase an issuing firm's efficiency and to allow shareholders to understand the risk-return characteristics of each of their investments and therefore manage the diversification of their own portfolio. Publicly held companies have typically responded by spinning-off non-core businesses and de-merging businesses where there is not clear synergy with the core business. However, de-merging and spinning-off businesses can be traumatic and irreversible processes, which most companies attempt to complete as quickly as possible in order to minimize the internal disturbance. Further, it is generally not possible to undergo a testing phase because of market sensitivities. These approaches therefore would not be appropriate for functions that, although not considered to be core, are regarded as vital to the running of the core business. Outsourcing can be an option for managing such functions and, over the last few years, has grown into an important service industry, particularly for support functions. Typical functions being outsourced are IT maintenance and support, facilities, security, etc. In the financial sector, typical functions being outsourced tend to be restricted to back-office functions such as settlements, clearing, safe custody, etc.

More recently, however, all firms have begun to outsource functions that were previously considered too close to either the strategic management of the core business or to the identity of the firm for outsourcing. JP Morgan outsourced both the ownership and management of the buildings from which it operates in the major financial centers. Some years ago, the concept of a prestigious firm not being the owner of the building that stands as a symbol of its reputation and prestige would have been unthinkable. Another surprising announcement was the outsourcing of the entire Human Resources function of BP Amoco to a relatively small California firm. The outsourcing of financial functions analogous to these has not been done as yet. Typical financial functions are treasury, credit management, risk management, and trading, together with several of their associated sub-functions.

Treasury management, for example, can be subdivided into the following financial functions: short-term funding and cash management, debt management, asset and liability management ("ALM"), and commodity price risk management. Another example of financial functions is market risk management comprising the middle-office support for the above treasury functions. Yet another example of financial functions is credit management, which can be subdivided into the following financial functions: credit spread trading (which can be further subdivided into the front-office credit spread trading function and the middle-office credit risk management function typically performed by more than one department, e.g. the market risk department and the credit department), counterparty exposure management, collateral management, credit risk management, and loan portfolio management. The last four financial functions are primarily middle-office type functions.

The activities that make up these financial functions are the relevant daily operations of the front-office trading departments and the associated middle-office risk management and back-office support departments.

Front-office activities can include:
1. Trading execution, sometimes referred to as passive trading.
2. Active trading, sometimes referred to as discretionary trading.
3. Hedging, sometimes referred to as front-office risk management.

Middle-office risk management activities can include:
1. Monitoring market and risk limits utilizations, reporting on accidental limit excesses, market and credit values-at-risk, and results of stress tests.
2. Monitoring credit risk limits utilizations with counterparties, borrowers, and corporate bond positions. This may include the computation of net counterparty exposure taking into account netting agreements, the production of daily credit limit utilization reports, and the processing of front-office requests for credit limit increases to the appropriate credit departments and/or management for authorization purposes.
3. Collateral management and reporting.
4. Supporting the front-office trading operations on the management of the lending and/or borrowing of securities and on the production of inventories reports.
5. Monitoring that all transactions are undertaken with eligible counterparties and on eligible financial products, and processing the front-office requests for increases in the universe of such counterparties and/or products.
6. Producing daily profit and loss ("P&L") reports. This is generally part of the middle-office function, although it could in principle be part of the back-office function.
7. Analyzing realized historical P&L combined with the historical risk limit utilization reports. Even if the P&L is produced by a financial control department as part of the back-office, such analysis provides a means of analyzing financial performance relative to the risks taken. Since risks need to be supported by capital, such analyses provide a measure of the returns on the capital utilized by the business and of the consistency of such returns. This type of analyses is an example of the management reporting function of the middle-office.
8. Comparing daily the actual P&L to a predicted P&L (constructed from the risk limit utilization reports of the previous day and the changes in prices and/or rates since the previous day). This is an example of an important operational risk management function of the middle-office.

9. Reporting output from the above activities to, for example, regulators. Another example of the external reporting functions of the middle-office are capital utilization reports.

"Back-office" support activities can include:
1. Settlements, which is the activity that ensures that all transactions/agreements entered into by the front-office are executed as agreed between the front-office and the counterparties.
2. The clearing and the reconciliation of cash balances, which ensures that, for each currency, business function, and/or subsidiary, the statements received from the counterparties corresponds to the internal cashflow reports constructed from the balances of the previous day combined with the inflows and outflows during the course of the day.
3. Payments, which is the activity that ensures that all payments are made and/or received as specified within the executed agreements.
4. Documentation, which is the activity (sometimes combined within the activities of the legal department) that ensures that all executed transactions/agreements are supported by suitable legal documentation in each jurisdiction.
5. Safe custody, which is the activity that ensures that all contracts and/or certificates relating to transactions/agreements entered into by the front-office are safely kept and/or can be promptly delivered as and when required. Whenever third party custodians are used in some areas, there is still a need to cross-check that the statements from the third party custodians agree with the internal inventory records.

The activities of the financial functions operate upon financial instruments, which can include each individual transaction/agreement that has been executed and/or might be executed, as well as exposures and/or operational cashflows. Transactions/agreements can be grouped into assets, liabilities, and/or derivatives, and can be financial (e.g. bonds, loans, equity shares, interest rate swaps, FX options, credit default swaps, etc.), related to traded commodities and their derivatives (e.g. gold price forwards, oil price swaps, copper price options, etc.), related to traded electricity (e.g. electricity price futures), related to insurable risks (e.g. insurance policies for weather, legal claims, documentation risks, property, life, credit, political risks, etc.), related to real estate, related to pension claims, related to legal claims, related to credit exposures (e.g. loans, bonds, counterparties, etc.), and/or related to operational cashflows. Operational cashflows may arise from the sale or purchase of services or products, while exposures to an underlying credit, price and/or rate may arise from a collection of one or more transactions/agreements and/or operational cashflows.

One important operation of the activity upon financial instruments can be a trade, which produces a position on the financial instrument. There might be several trades on the same financial instruments over any period of time. For example, in the case of a bond, during the course of a day there might be both sales and purchases of different amounts of the bond. If the net position is negative, the net position is said to be a "short position", otherwise a "long position".

Other operations of the activity upon financial instruments are middle- and back-office type operations as described above.

Not all activities upon financial instruments define a financial function. For example, a portfolio of derivatives with the same counterparty does not necessarily constitute a financial function just because all the financial instruments (i.e. all the derivatives) have a common counterparty. However, if the counterparty is the only counterparty with whom the client trades derivatives in connection with, say, its ALM function, and the portfolio of derivatives is accompanied by a set of guidelines that describe, for example, its purpose, objectives, and/or criteria for measuring performance, then such activities upon the portfolio of derivatives might qualify as a financial function.

Similarly, the solitary activity of seeking the best available investment product and/or house loan or mortgage at a particular point in time does not necessarily constitute a financial function. However, the on-going management of investments and loans and/or mortgages following specified guidelines might qualify as a financial function.

Turning to outsourcing, the outsourcing of back-office functions is a well-established business of management consultancy firms, yet the combination of back-office functions with the entire middle-office function is unknown. This is because there would be an additional liability for the agent that took over an entire middle-office function within a separate information environment from that used by the client for the front-office functions. For example, whenever profit and loss ("P&L") and risk limit information is provided by an agent to a client, an error could lead the client to implement the wrong strategy and, with the benefit of hindsight, the client could always claim that he would have followed a different strategy had it not been for the error. Without transparency between the front-office activities of the client and the middle-office activities of the agent on behalf of the client, quantifying the liability of the agent would be difficult and therefore the cost of insuring it would be very high. This is one of the reasons why firms offering back-office outsourcing have been reluctant to even consider providing the middle-office function. Moreover, these back-office outsourcing firms tend to feel that middle-office functions are just too close to front-office trading activities of clients. Trading requires highly specialized markets knowledge and skills, and is therefore regarded by firms that provided back-office outsourcing as being outside the scope of their business.

Transparency can mean enabling the communication of information and/or the access to information across a network. Real-time transparency means that the information would reach the other party with a delay of less than say a relatively few seconds (such as, for example, within 0 to 60 seconds, 0 to 15 seconds, and/or 0 to 5 seconds). Near-real-time transparency means that the information would reach the other party with a delay longer than just a relatively few seconds (such as, for example, within 5 to 600 seconds, 10 to 60 seconds, and/or 15 to 30 seconds). On-demand transparency means that the information reaches a requesting party only after requested. Thus, on-demand information can be received in real-time, near-real-time, or after a substantial delay.

Some prime brokers and custodians might provide certain middle-office functions to their clients in order to attract more business, but only in respect to the transactions undertaken through them or under their custody, and typically without any form of transparency. Since clients tend to have more than one prime broker and/or custodian, this middle-office outsourcing is of limited use. This is because, unlike the evaluation of total returns/costs on a portfolio of investments/liabilities or the production of total P&L statements, which can be constructed as the sum of the parts evaluated independently, the construction of total risk requires certain knowledge of the entire financial function of the client. Otherwise, diversification effects might not be captured, and, more importantly, it might not be possible to even define the concept of "risk" which typically depends on the period over which performance is to be measured together with other strategic objectives of the financial function.

Contrary to outsourcing, there are a number of risk management Application Service Providers ("ASPs"), which includes software models offered via networks by investment banks and their affiliates that allow clients to use the risk management and trading tools themselves and to seek information. The responsibility, however, for implementing and correctly using these software tools, seeking the appropriate information, and using the information, remains with the client, as the ASP only assumes the responsibility for maintaining the software and the hardware. In order to evaluate the benefits of an ASP, the key assumption is that the ASP is used properly and the client acts on the information received, as expected by the designer of the software or the ASP. The liability for the ASP is therefore the same as that for the sale of any software or the provision of advice. There are also software vendors and advisors that offer trading and risk management models, sometimes in the form of ASPs, that might allow clients to improve the management of financial functions mentioned above, but always assuming that the models and the advice are used properly. Financial software service providers typically do not act on behalf of their clients. Further, ASPs, software vendors, and advisors typically provide services and products for end-users within a particular vertical or sector, rather than for agents acting on behalf of multiple clients whose business might span multiple verticals or sectors. In this context, it should be emphasized that a client that provides, say, internet banking services to its clients is still regarded as an end-user because the internet banking services constitute one vertical or sector.

Although in theory investment banks could develop the technology to offer to undertake certain activities of some of their clients' financial functions, this undertaking would need to be carried out within Chinese walls to avoid conflicts of interest between those traders acting on behalf of clients and in the clients' best interests and those traders of the investment bank acting as principals, rather than agents, with other clients, counterparties, and/or exchanges. Chinese walls are internal procedures designed to deal with conflicts of interest between different teams within the same firm and, in particular, to separate a Mergers & Acquisitions ("M&A") type advisory business from a trading business. However, Chinese walls for multiple clients within the same or similar trading business are difficult to implement, and frequently impossible to manage effectively and safely, so that, in practice, investment banks would need to set-up separate subsidiaries to undertake the business of providing financial functions to their clients. No such subsidiaries have been set-up other than to provide pricing and risk management services, typically either in the form of risk management and trading software sales and advice or in the form of ASPs.

In contrast to investment banks, the regulatory framework governing fund management activities is such that it would allow fund managers to assume financial functions of a plurality of clients with no conflict of interest. However fund managers have focused on increasing the size of the funds under their management through the sale of fund shares to their clients. The background and business culture of fund managers has not encouraged them to seek to enhance the services they provide to clients whose funds they manage nor has it encouraged them to approach other clients that could benefit from outsourcing financial functions which do not involve the management of money. In the few instances where fund managers provide investment management functions to their clients as agents, rather than as principals selling fund shares and trading on behalf of the fund, they have done so without demonstrating transparency to their clients and without enabling the clients to interact with the agent, access information, and/or monitor the agent's activities.

Furthermore, unlike investment banks, fund managers are not creators of technology and have consequently, at least until now, been reluctant to embark in technology intensive businesses. Investment banks, on the other hand, have provided state-of-the-art risk management technology to clients initially as a means of generating more business, and only recently on "an arms-length basis" through their technology affiliates. However, investment banks have avoided the provision of standard technology and assistance to clients in the more labor intensive middle-office functions and back-office functions, namely because management consultants have been better equipped to provide such functions at a lower cost and without conflicts of interest.

Thus, there has not been a sector of the financial services industry that possess the necessary ingredients, in terms of demonstrating transparency, business culture, absence of conflicts of interest, and expertise in creating models that can cope with both high transaction volume and state-of-the-art analytics, to focus on the commercial and/or technical aspects of embodiments of the present invention.

The lack of appropriate data interchange standards has also made certain embodiments of the present invention commercially infeasible until now. For example, unlike a fund manager, who typically only needs to receive the funds and investment criteria from the client in order to get started, a financial risk manager (i.e. the agent in the present invention) typically needs to receive detailed transaction information on all the financial instruments and their positions relevant to the financial function. The commercial feasibility of providing financial functions for multiple clients which requires the agent to receive such detailed and frequently very complex information is enabled today because of the development of data interchange standards, such as XML, by which network-based systems can communicate in such a manner as to allow the relative low cost transfer of large quantities of detailed transaction information from potentially many different electronic sources.

Finally, the lack of reliable communication security has also held back the imagination of potential inventors of the various embodiments of the systems and methods of the present invention. For example, it is only recently that cryptography has become standardized, wide spread, and trusted sufficiently for use on public networks as opposed to proprietary closed networks. Examples of such technologies are public-key encryption, key certification, digital signatures, hash functions, SSL, etc. Currently, there are no agents that provide entire financial functions to their clients by demonstrating transparency. Conversely, clients are unlikely to outsource financial functions to an agent if the agent is not able to demonstrate transparency and lack of conflicts of interest. Further, it is unlikely that potential agents could run financial functions at costs lower than those incurred by the clients without the appropriate secure and reliable data transfer technology and/or without being able to quantify the liability associated with the running of such functions.

Notably, in many situations, real-time or near-real-time transparency can be necessary for an agent to earn sufficient trust from a client so that the client is willing to outsource entire financial functions, and in some situations can also be necessary for the agent to be willing to assume the liability associated with taking over such financial functions. To achieve such transparency, certain embodiments of the invention recognize that a network-based user interface can be advantageously provided to enable a client to access continuously, in real-time or near-real-time, information relating to the day-to-day and/or intra-day activities of an agent acting on behalf of the client. In certain situations, this monitoring can be done more effectively than monitoring the activities of the client's own risk management and trading staff through a glass partition. The client might access, through the network-based user interface, the risk management information generated by the agent and thus determine how the agent reacts to such information without the need to request the information from the agent. The access to the information on the activities of the agent can be silent, wherein the agent is not made aware when the client is monitoring the agent's activities, or can be based upon requests made by the client through the network.

In addition to monitoring, the client can also receive information automatically from the agent via this network-based user interface, or through different methods, such as, for example:

1. urgent messages can be received at the client, for example, on a screen of a computer, pager, wireless telephone, and/or wired telephone, etc. An example of such a message is: "The JPY interest rate position has exceeded the 10-year equivalent limit by 8%. The sale of N futures contracts would restore the position to 10% inside the limit. These contracts will be sold within the next x seconds unless we receive your stop message beforehand";
2. a less urgent message can be received at the client via an e-mail, voice-mail, and/or fax, etc., such as, for example, "EUR y million deposited with XYZ bank to mature in two days. The deposit will be rolled over with TVW, another eligible deposit counterparty that has posted a better rate, unless we receive your overrule message before 9:30 am tomorrow";
3. daily market and credit limit utilization reports can be received via e-mail, fax, push-technology, and/or posting to a web page, etc.; and
4. weekly and monthly performance and risk reports, both in terms of the average expected volatility of positions and in terms of consistency of past realized performance can be received via e-mail, fax, push-technology, and/or posting to a web page, etc.

Furthermore, the client might even participate, over the network-based user interface, in new product, credit, and/or market risk committees conducted by the agent on behalf of the client. If desired, the client can interact with the agent over the network by, for example, modifying the financial guidelines in light of new information, historical action reviews of the activities of the agent, and/or the behavior of the economy, markets, and/or clients. Conversely, the agent can request the client to modify financial guidelines in light of such information and the client might or might not accept the recommendations of the agent in this regard.

The above type of transparent access to information between a client and an agent, combined with communication security over public networks, the widespread use of data interchange standards, and the proliferation of exchanges and counterparties that permit and/or facilitate the electronic identification, negotiation, and execution of trades, have helped to make certain embodiments of the present invention useful, practical and commercially feasible today.

A more detailed description of various embodiments of the present invention follows.

Additional Description

Certain embodiments of the present invention provide a method for providing financial functions by an agent for each of a plurality of clients. One embodiment includes, relating to a financial function of each client, demonstrating that more than one activity of the agent can be transparent to the client, receiving financial information at the agent, creating risk management information relating to the financial information, analyzing the risk management information in the context of the financial information, determining an action based on the analysis, facilitating implementation of an action on behalf of the client, and communicating with the client through a network one, two or more activities of the agent.

An action can include the negotiation and execution of a transaction or trade with a third party that results in the creation of a binding contract between the third party and the client. An action can also include an instruction or recommendation for the client to enter into a binding contract with a third party but where it is expected and/or agreed by the agent and the client that such instructions or recommendations will be followed by the client under the normal course of events. The client might from time to time overrule the agent and/or change the financial guidelines and/or risk limits.

Certain embodiments of the present invention can involve front-office activities, which, as mentioned above, can include trading execution, active trading, and/or hedging.

"Trading execution" can mean the execution of trades in line with the financial guidelines on a best efforts basis by the agent. Trading execution can be performed in a number of financial functions, including, for example:

1. Cash management and short-term funding, e.g. issuing certificates of deposit and entering into foreign exchange forward contracts. An execution-only trader might contact two or three counterparties, or communicate with one or more exchanges, compare prices and execute. Depending on the liquidity of the market, more than one trade might be needed with one or more counterparties and/or exchanges to achieve the desired position.
2. ALM, e.g. hedging operational cashflows. An execution-only trader might hedge an $80 million outflow in year 5 by buying the appropriate number of zero coupon Treasury bonds through one or more counterparties and/or exchanges. If there is no zero coupon bond of the exact maturity of the operational cashflow, the trader might need to work out the nominal size of the bond to be purchased that is required to hedge the position in accordance with the financial guidelines provided by the client.
3. Credit management, e.g. combining the credit exposure created from the client's commercial lending operations, from credit spread trading and/or from counterparty exposure on the client's treasury operations. An execution only credit trader, in charge of managing the credit exposure to one or more credits, might sell bonds and/or loans linked to the relevant credits provided that such bonds and/or loans are available to the trader to sell, and otherwise the credit trader might use of credit derivatives with eligible counterparties to manage the exposure to the relevant credit. In this case, the execution trader might reduce the exposure in accordance with the financial guidelines by determining the required type and size of trade or trades, contacting counterparties, negotiating the best price and terms, and executing the trade or trades on behalf of the client.

"Active trading" can mean execution of trades beyond those required to follow the financial guidelines, but within the risk limits, and at the agent's own discretion. Active trading can be implemented in a number of financial functions, including, for example:

1. Cash management and funding, e.g. an active trader might not wish to enter into the foreign exchange contracts required to maintain the currency composition specified in the financial guidelines after the issuance of the certificates of deposit. This could be because the trader believes that the currency in which the certificates of deposit were denominated might be devalued and therefore wishes to take an even bigger position relative to the financial guidelines or benchmark by selling options on that currency. The active trader would be entitled to enter into such option contracts provided that he remains within the risk limits. At the end of the evaluation period, the performance of the strategy will be measured and, if the trader was correct in his assessment of the market, then both the agent and the client might benefit as the client will keep the profits and the agent might earn an out-performance fee. If the result is a loss, then this might be absorbed in its entirety by the client with immediate effect and through time by the agent as the cumulative effect of the loss might be deducted from future out-performance fees. If the out-performance fee is allowed to be negative, then the agent might need to be capitalized.
2. ALM, e.g. an active trader might buy more zero coupon bonds than those required to hedge the $80 million payment of example 2 above if his view of the market was that year 5 interest rates will rise. Example 2 above is the neutral strategy or benchmark against which the performance of the active trader can be evaluated.
3. Credit spread trading, e.g. an active credit trader might have a view on the credit position that was created through the client's operations and might or might not want to follow the action specified by the financial guidelines undertaken in the case of example 3 above. If the active credit trader chooses not to follow the neutral strategy or benchmark, then his performance relative to that neutral strategy or benchmark might be measured. Any gain or loss might be assumed by the client with immediate effect, and by the agent in due course through his out-performance fee arrangements.

The activity that includes execution traders and active traders is typically referred to as front-office activities, dealing room activities, and/or trading activities. For small financial trading operations, only relatively senior managers have active trading discretion so that the front-office tends to comprise mainly execution only traders. For large financial trading operations, active traders are included within the front-office. In practical terms, the distinction between a change in the neutral strategy or benchmark and an active trading decision is rather artificial, and it is therefore not imperative make such a distinction unless the client wishes to measure the performance of the different components of the financial function. The differentiation between changes in the neutral strategy or benchmark and active trading decisions is of course important if the financial function is to be outsourced to an agent engaged in discretionary trading, otherwise it might be difficult to determine a fair out-performance fee.

The activity that includes front-office risk management is frequently referred to as "hedging". Such activity can also be regarded as part of the activity of execution-only traders and/or active traders. For example, if a trader at the client (or at the agent acting on behalf of the client) provides an interest rate swap to a client of the client who is an end-user (rather than a market counterparty), then such a trader might "hedge" the risk created by the provision of such swap by, for example, buying and/or selling futures contracts with an exchange.

Embodiments of a method of the present invention can allow for an agent to perform middle-office activities on behalf of multiple clients where, in some cases, each client might be outsourcing either a different type of financial function, a different class of financial instruments within the same activity, different financial guidelines, different benchmarks, different measures of performance and/or risk, and/or different risk limits within the same type of financial function.

Embodiments of a method of the present invention can also provide for high levels of security to prevent any client or any third party from accessing and/or receiving unauthorized information and/or interfering with the activities of another client or of the agent on behalf of another client.

Further, embodiments of a method of the present invention can include the appropriate internal procedures and regulatory framework to avoid internal conflicts of interest at the agent, such that the agent remains conflict-free. Financial regulators of the agent might monitor these procedures, particularly if the clients of the agent include unregulated clients such as corporates and other end-users.

Other embodiments of the method of the present invention can include the appropriate internal procedures and security framework to reduce operational risk at the agent when acting on behalf of the client. For example, the front-office of the agent might have the authority to test the effect of new potential transactions but might not have the authorization to modify a transactions once booked. Conversely, the middle-office of the agent might have the authority to modify a transaction that has been booked in error but might not have the authority to enter and book a new transaction. In particular, for regulated clients of the agent such as banks and other financial services firms, financial regulators of the client might inspect these procedures and security framework at the agent before allowing the regulated client to outsource the financial function to the agent.

Method 100

FIG. 1 is a flowchart of an embodiment of a method 100 of the present invention. Method 100 can begin at activity 1010 by demonstrating that one, two, or more of the agent's activities can be transparent to the client. The demonstration can be performed by the agent, and can include an explanation of the activities of the agent. The demonstration can also explain how the client might be enabled by the agent to access information and/or monitor activities of the agent.

Method 100 can continue at activity 1020 by receiving financial information at the agent from the client. The financial information can include, for example, detailed information pertaining to the financial instruments relevant to the financial function, financial guidelines for the management of the function, a benchmark that provides criteria for the measurement of performance of the agent, risk limits, if any, which allow the agent to deviate from the benchmark at the discretion of the agent, and historic and current market price information in connection with the financial instruments.

An example of a financial guideline for a debt management financial function is to fund a treasury operation so as to meet specified liquidity guidelines at a cost of, say, government bonds plus 45 basis points or better. The benchmark or neutral strategy in this case might be government bond yields plus 45 basis points.

Another example of a financial guideline for a credit risk management financial function is to hedge all swaps counter-party or corporate bond net credit exposures below a specified minimum credit rating provided that netting agreements are in place in the appropriate jurisdiction. The returns, costs, or P&L of the hedged portfolio might constitute the benchmark for the agent.

Risk limits can be used to allow the agent to use its discretion to deviate from the benchmark, provided that the actions facilitated by the agent do not infringe these limits. Risk limits can be expressed in many different ways, for example: (i) a maximum deviation of +/−10% from the benchmark currency composition of, say, 30% USD and 70% EUR; or (ii) a maximum deviation of 0.5 years from the debt portfolio benchmark duration of, say, 2 years; or (iii) a maximum long or short exposure to Sterling Pound interest rates equivalent to, say, £100 million of 10-year Gilts, e.g. if interest rates fall by 10 basis points, then a short position will lose approximately £0.4 million (=−10 bp×duration of 10-year Gilt×£100 million), while a long position will gain the same amount.

Other examples of risk limits can be expressed statistically in terms of value-at-risk. For example, a risk limit expressed as, say, $40 million 10-day 95% value-at-risk means that the agent might use its discretion to deviate from the benchmark provided that such deviation, if maintained over a period of 10 days, would not have resulted in a market value loss greater than $40 million other than in the worst 5% scenarios over the historical period considered for the calculation, typically of the order of 1-3 years.

Examples involving a credit management financial function might include maximum holdings limits in each credit rating class (e.g. maximum of 30% of the total credit exposure in credits rated BBB or below), further split by country (e.g. no more than 20% of the total exposure with Asian credits) and by industry (at least 50% of the total counterparty credit exposure must be with banking counterparties rather than corporate end-users).

Other examples of credit risk limits can be expressed statistically as in terms of credit value-at-risk. For example, a credit value-at-risk of $100 million for a $1 billion total exposure means that maximum credit losses for the total exposure over its life are only likely to exceed the expected credit losses by $100 million in 5% of the scenarios.

At activity 1030, historic and current market information can be received by the agent typically from third parties, but some market information might also come from the client, as described for activity 1020, and as shown in activity 1035. Examples of historical information for financial instruments are: the end-of-month price of a ton of copper, the daily price of an equity share or of a unit of a corporate bond over the last year, end-of-month swap yield curves and FX rates for all European currencies over the last 3 years, and average monthly credit spreads on the corporate bonds of BBB-rated issuers over the last 5 years. Examples of current market information are today's prices, rates, credit spreads, and/or yield curves for the financial instruments mentioned above.

At activity 1040, risk management information can be created. To create risk management information, the financial information can be combined with the historic and current market information. For example, the financial information might include positions on the financial instruments relevant to the activity, such as 10-year bond short position in US Dollars and a long position in Sterling 3-month LIBOR. A matrix can then be created, based on the historical and/or current market information, that includes estimates of volatility of unit positions in each of the above two financial instruments and of the correlation between them. Such a matrix can then be combined with the positions to provide a measure of the risk of the combined positions or portfolio of positions. At one extreme, this risk management information might be created by a middle-office from millions of positions using high performance computer models and large market historical databases, while at the other extreme it might be created mentally for a handful of positions by a front-office trader who will likely have an approximate view risk of each of his positions and of the relationships between them.

More examples of front-office risk management information are position reports produced by trading software models showing the net mark-to-market positions, together with position sensitivities measures such as: the price value of 1 basis point change in yields ("PV01") or 10-year bond equivalent type measures; the rate of change of price or volatility with respect of changes in the underlying variables and the rate of change of such rates of change (typically denoted with letters from the Greek alphabet such as delta, gamma, vega, etc.); funding projection reports; rate reset reports; option exercise reports; and credit spread sensitivity reports (e.g. broken down by sector, currency, and/or counterparty/issuer).

Another example of middle-office risk management information is the absolute market value and market value-at-risk, cashflow-at-risk, or credit value-at-risk of the benchmark itself. The benchmark actions can be regarded as a neutral strategy for the management of the financial instruments relevant to the activity and therefore one can calculate its daily market value (and/or rate of return in the case of a net asset portfolio or cost in the case of a net liability portfolio) and market value-at-risk, cashflow value-at-risk, and/or credit value-at-risk. Examples of market value-at-risk and credit value-at-risk have been provided above. Cashflow value-at-risk is completely analogous to market value-at-risk example above except that the loss is measured in terms of a cashflow at a particular point in the future rather than market value which includes the present value of all future cashflows.

Yet another example of middle-office risk management information is the relative daily market value and market value-at-risk of the actual actions undertaken by the agent relative to the benchmark actions. In the first example, i.e. the absolute case, the risk management information is designed to assist monitoring the expected performance of the benchmark itself, while the second example, i.e. the relative case, is designed to monitor the expected performance of the agent.

Some of the front-office type risk management reports can also be produced by the middle-office combining the activities of several traders and/or trading business, e.g. the overall exposure of the entire front-office trading teams to a devaluation of the Euro, or the total exposure to a raise in Yen interest rates expressed in terms of 10-year bond equivalent positions. These are further examples of middle-office risk management information.

Another example of risk management information is the daily cumulative P&L and statistical measures relating to its historical realization compared to the utilization of the risk limits. Such risk management information could include the standard deviation of the realized daily historical P&L for the benchmark relative to that for the actual actions of the agent, compared to the average relative value-at-risk utilized. This risk management information can be created based on a review of historical actions of the agent at activity 1080 and fed back into activity 1040.

At activity 1045, the risk management information can be provided to the client. This communication can take place through a network and can be automated.

At activity 1050, the risk management information can be analyzed to create an analysis. An analysis of risk management information typically requires combining it with other information such as economic and political information together with the application of some form of judgment based on knowledge of the objectives of the financial function. For example, risk management information based on historical data might be useless information to determine an action during periods of crisis, where stress scenario type risk management information is likely to be more appropriate. Further, the risk management information might also be meaningless unless viewed in the context of the financial guidelines for the financial function.

Although in more than one embodiments of the present invention some analyses of risk management information are automated, typically there is a need for either human action or for some form of "artificial intelligence" type action. The latter might be provided in some embodiments of the invention by an expert system able to trigger automated actions based on knowledge of the financial function. For example, the expert system could determine, based on pre-programmed rules, that during periods of extremely high market volatility, the credit rating or default probability of certain types of credits such as hedge funds deteriorates by an specified amount. The expert system could then use the revised data to modify the limits and/or trigger reductions in the exposure to certain credits until normal market conditions return. At the same, time the expert system can replace the value-at-risk measure used for the limits with a stress test measure, which is more appropriate during periods of financial crisis. Other examples of expert systems can be used by embodiments of the present invention where the actions are determined automatically by, for example, communicating electronically with network-connected exchanges and/or counterparties and executing trades whenever certain trigger levels (e.g. in terms of distance from the limits) are reached.

At activity 1055, the analysis can be communicated to the client who might provide feedback. This communication can occur by any known method, including in person, by telephone, facsimile, e-mail, pager, instant messaging, IRC, push technology to a browser, and/or publication on a web page with notification thereof, etc.

At activity 1060, an action can be determined based on the results of the analysis. An action can be determined with or without feedback on the analysis from the client, either in order to follow the financial guidelines and benchmark, or in order to deviate from the benchmark at the discretion of the agent within the risk limits. An action can involve the negotiation and/or execution of a trade on behalf of the client, or the provision of a recommendation or instruction to the client to execute a trade. An action can also include the production on behalf of the client of reports or notifications for the client, and its subsidiaries, affiliates, clients, auditors and/or regulators.

Activity 1060 can include determining an action, which might include, for example, the automatic identification at a given time based on knowledge of the financial function of a best rate or price at which a trade can be executed. The information used for this activity can be obtained at activity 1030, for example, by communicating with two or three exchanges and/or counterparties and receiving market information whenever certain conditions specified within the financial guidelines arise. This can be followed by checking and comparing rates or prices, and selecting the best rates or prices. Moreover, in addition to the best rate or price, a second rate or price can also be identified in the event that the best prices might only be good for an amount smaller than the desired amount.

At activity 1065 the actions determined might be reported to the client via any previously described means, such as through a network, and the client can provide feedback. For example, the client might request the action to be halted.

At activity 1070, implementation of the action can be facilitated, and this can happen with or without feedback from the client such as shown in activity 1075. For example, in activity 1070, the implementation might be facilitated by the agent negotiating the documentation with a third party, and executing the trade with the third party on behalf of the client. Alternatively, implementation might be facilitated by the agent negotiating the contract with a third party and, providing the contract document within the instruction or recommendation to the client for the client's signature, which can be a secure electronic signature or otherwise. As another example, at activity 1070, implementation can be facilitated by the agent by requesting, at activity 1075, that the client click an on-screen button authorizing the agent to implement the action on the client's behalf. Such instruction or recommendation might occur with the understanding that client approval is assumed, thus merely providing the client an opportunity to request that implementation of the action be halted.

As yet another example, in activity 1070, implementation can be facilitated by the agent submitting a notification on behalf of the client directly to auditors, regulators, subsidiaries, affiliates, and/or clients of the client. This type of implementation of action can happen automatically and/or at regular intervals, but can also happen when pre-specified conditions are fulfilled or whenever the agent regards the action to be appropriate.

In activity 1080, the agent can review historical actions taken on behalf of the client in light of new information, and in activity 1085, can communicate the results of this review to the client who might provide feedback to the agent, and the agent might receive that feedback at activity 1020, 1040, and/or 1050 either before or after the agent receives further financial information from the client. Activity 1080 can enable the client to examine a verifiable audit trail of communication given to and received from the client by the agent, as well as a record of the information and data created and/or used by the agent to conduct analyses and/or undertake actions on behalf of the client. Such records might be used with the benefit of hindsight to reconstruct the reasons for the actions undertaken by the agent on behalf of the client. This historical transparency can protect both the client and the agent from any disputes that might arise and give the client and its regulator confidence that the agent is performing its functions with competence and is working in the best interests of the client. This audit trail can include a log of all trades (including intra-day trades with dealer timings), a record of relevant market conditions at the time of each trade (e.g. alternative rates/prices available at the time of the execution of the trade), a record of the evolution of the positions and risk reports, etc.

The ongoing review of historical actions by the agent can also serve to improve the agent's creation and analysis of risk management information, and the decisions based thereupon. Therefore the results of these historical reviews can be fed directly by the agent into activity 1020, 1040, and/or 1050.

Any of activities 1010 through 1085 can occur automatically (i.e. without human interaction), semi-automatically (i.e. with minimal human interaction, such as, for example, clicking an on-screen button to initiate the activity), or with more extensive human interaction.

Moreover, the agent and the client can communicate across a network in connection with the activities and sub-activities of method 100. Such communication can occur in the form of reporting the agent's activities to the client, empowering the client to access information on one or more of the activities of the agent, enabling the client to request additional information on one or more activities of the agent, and/or allowing the client to monitor the agent's activities with or without the agent's knowledge. The reporting, accessing, and/or monitoring of the agent's activities can occur in real-time, near-real-time, on-demand, and/or intermittently. Further, to the extent desired by the client, the client can interact with the agent, either across the network or otherwise, to inquire about, discuss, intervene in, and/or overrule an activity of the agent. The communication can occur by any known method, including those that can be enhanced to an acceptable level of security, including in person, by telephone, facsimile, e-mail, pager, push technology to a browser, publication on a web page with notification thereof, etc. In certain embodiments, the communication can occur in a secure manner.

System 200

Figure 2:
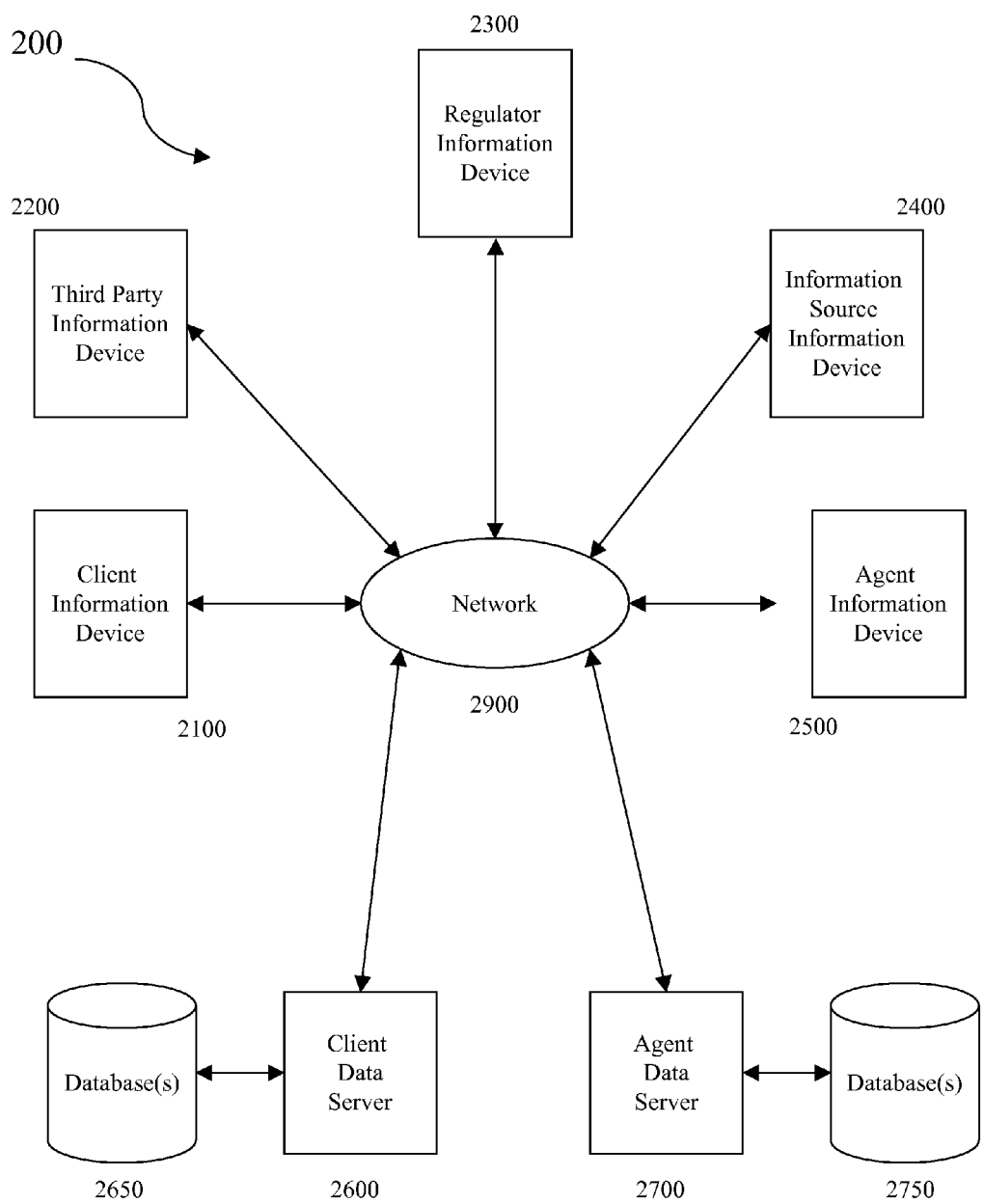
FIG. 2 is a block diagram of a system 200 of the present invention.

FIG. 2 is a block diagram of an embodiment of a system 200 of the present invention. As an initial matter, it suffices to say that, using the description of method 100, one of ordinary skill in the art can implement the functionality of method 100 via system 200 utilizing any of a wide variety of well-known architectures, hardware, protocols, and software. Thus, the following description of system 200 can be viewed as illustrative, and should not be construed to limit the implementation of method 100.

Within system 200, a client information device 2100 can be used, for example, to communicate with other information devices (e.g. another client information device 2100, third party (e.g. exchange or counterparty) information device 2200, regulator information device 2300, information source information device 2400, agent information device 2500, etc.), with a server (e.g. client server 2600 and/or agent server 2700), and/or with third party market data server 2800. Client information device 2100 can also be used, for example, to manage databases, query databases, provide financial information, receive risk management information, receive analysis results, receive action instructions or recommendations, implement actions, receive and/or implement notifications and/or reports, facilitate the implementation of actions, to access information on, and/or to monitor, activities of the agent.

Similarly, agent information device 2500 can be used by an agent to communicate with other information devices (e.g. client information device 2100, third party information device 2200, regulator information device 2300, information source information device 2400, another client information device 2100, etc.), and/or with a server (e.g. client server 2600 and/or agent server 2700). Agent information device 2500 can also be used, for example, to manage databases, query databases, receive financial information, create risk management information, analyze risk management information, facilitate the implementation of actions, review historical actions, and communicate risk management information, analyses, results, instructions or recommended actions, implemented actions, notifications, reports, and/or to enable the client to access information on, and/or monitor, activities of the agent.

Each information device 2100-2500 can be connected to network 2900. Also connected to network 2900 can be servers 2600, 2700. Any information device 2100-2500, and/or any server 2600, 2700, can be attached to one or more databases (not shown), and can function as a server of the one or more databases and/or software applications (not shown).

Third party information device 2200 can be used, for example, to propose, enquire, negotiate, communicate, and/or receive actions. Regulator information device 2300 can be used, for example, to request, communicate, send and/or receive reports, messages, and/or notifications. Information source information device 2400 can be used, for example, to communicate financial information reports, messages, and/or notifications, such as, for example, market information regarding, interest rates, exchange rates and/or the current market value of a specified derivative.

Client server 2600 can be used to host one or more databases 2650, host communication software, host web sites, serve files, serve e-mail, etc. Agent server 2700 also can be used to host one or more databases 2750, host analysis and/or communication software, host web sites, serve files, serve e-mail, etc. Agent server 2700 can be a computing device of any sort.

Network 2900 can electronically link physically distant information devices 2100-2500, and servers 2600, 2700, so that information can be transmitted and/or exchanged there between. Network 2900 can have any architecture, including a direct connection, a local area network, a wide area network such as the public switched telephone network and/or the Internet, an extranet, and/or a combination thereof. Network 2900 can be a packet-switched, a circuit-switched, a connectionless, or connection-oriented network or interconnected networks, or any combination thereof. Network 2900 can be oriented toward voice and/or data communications. Moreover, a transmission media of network 2900 can take any form, including wireline, satellite, wireless, or any combination thereof. In certain embodiments, the transmission media of network 2900 can be limited to those that support the secure transmission of data.

From a hardware standpoint, any information device 2100-2500, can be, for example, a landline or wireless telephone, facsimile, personal computer, workstation, personal information manager, personal digital assistant, handheld computer, data terminal, or other similar device. Similarly, any server 2600, 2700 can be, for example, a landline or wireless telephone, facsimile, personal computer, workstation, mini-computer, mainframe computer, personal information manager, personal digital assistant, handheld computer, data terminal, or other similar device.

Device 300

Figure 3:
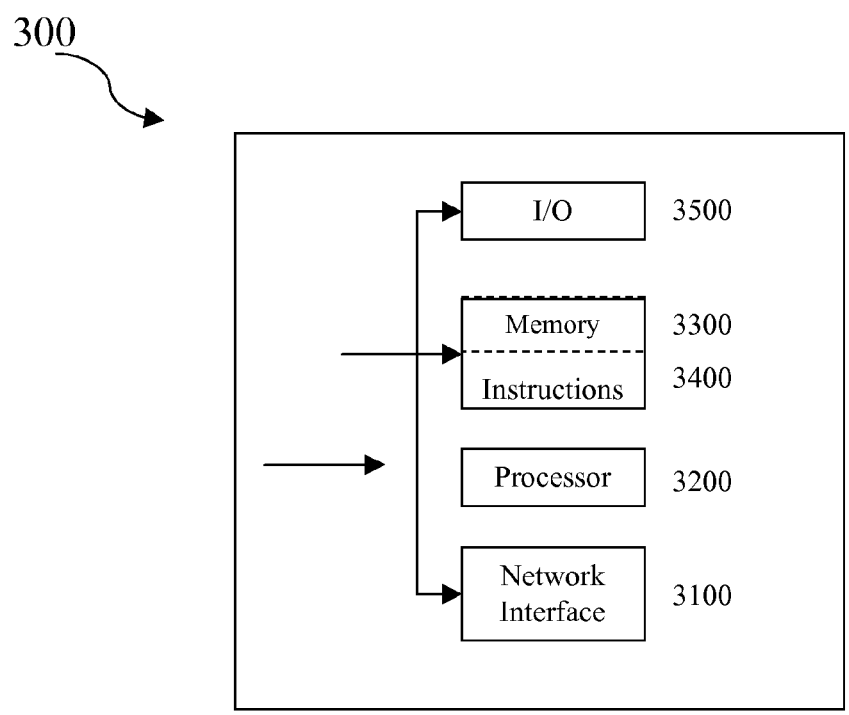
FIG. 3 is a block diagram of an information device 300 of the present invention.

FIG. 3 is a block diagram of a typical information device 300, which can symbolize any information device 2100-2500, and/or servers 2600, 2700. Information device 300 can include well-known components such as one or more network interfaces 3100, one or more processors 3200, one or more memories 3300 containing instructions 3400, and/or one or more input/output ("I/O") devices 3500.

In one embodiment, network interface 3100 can be a telephone, a traditional data modem, a fax modem, a cable modem, a digital subscriber line interface, a bridge, a hub, a router, or other similar devices.

In one embodiment, processor 3200 can be a general-purpose microprocessor, such the Pentium series microprocessor manufactured by the Intel Corporation of Santa Clara, Calif. In another embodiment, the processor can be an Application Specific Integrated Circuit (ASIC), which has been designed to implement in its hardware and/or firmware at least a part of a method in accordance with an embodiment of the present invention.

In one embodiment, memory 3300 can be coupled to a processor 3200 and can store instructions 3400 adapted to be executed by processor 3200 according to one or more actions of method 100. Memory 3300 can be any device capable of storing analog or digital information, such as a hard disk, Random Access Memory (RAM), Read Only Memory (ROM), flash memory, a compact disk, a magnetic tape, a floppy disk, and any combination thereof.

In one embodiment, instructions 3400 can be embodied in software, which can take any of numerous forms that are well known in the art. For example, system 200 can utilize one or more databases having a flat file or a relational organization, and a centralized or distributed architecture. For instance, those of skill in the art can tailor products such as an SQL database to provide the functionality of method 100 and system 200. One supplier of such database products is Oracle Corporation, of Redwood Shores, Calif. Moreover, software standards and protocols such as EDI, FTP, HTTP, HTML, XML, cXML, XSL, SSL and WAP can be utilized for communications between information devices. Additionally, system 200 can utilize platform-independent and/or network-centric software tools such as, for example, CGI, Java, or JavaScript. In one embodiment, I/O device 3500 can be an audio and/or visual device, including, for example, a monitor, display, keyboard, keypad, touch-pad, pointing device, microphone, speaker, video camera, camera, scanner, and/or printer, including a port to which an I/O device can be attached or connected.

Exemplary Utilization: Short-Term Funding and Cash Management

We now turn to an exemplary utilization of an embodiment of the invention involving short-term (typically less than a year with the majority of financial instruments settling in less than 90 days) funding and cash management. Short-term funding and cash management typically involves foreign exchange forwards and options, repos and money market instruments such as commercial paper and certificates of deposit, notes and bonds with, typically less than a year to maturity, overdraft facilities, and bank deposits.

In this example, the agent first demonstrates the transparency of the method. The demonstration might involve a presentation to the client on how he might be enabled to access information and/or a trial period of one, two, or more of the agent's activities described below. After the demonstration, the agent begins receiving information on a daily basis (or more frequently if required) of all known or expected inflows and outflows from operations at the client over the next few days and/or months. Based on this information, together with the financial guidelines on the minimum liquidity to be maintained (e.g. on demand, two-days notice, one-month notice, etc), the agent borrows and invests in the markets to meet all cashflow deficits and surpluses respectively. The maturity of the borrowings and investments takes into account the shape of the yield curve in each currency. By incorporating the ability to search for the best rate or price and transact electronically with eligible counterparties and exchanges, the agent might automate this front-office treasury function, provided that the information from the client regarding the operational cashflows of the business function is fed into the agent's systems and updated with the required frequency necessary for the effective performance of the financial function.

For some clients, such as corporates and commercial banks, the information can arrive at the agent directly from the operational units of the client, while in other cases the cashflow information can be generated by the agent's systems themselves. The latter applies to clients with pure trading businesses such as hedge funds or capital markets operations of small investment banks which tend to have treasury departments comprising of three or four market professionals to support a team of, say, ten proprietary traders and, say, ten sales and trading professionals respectively.

The typical size of such purely financial trading business might include in addition to the front-office described above, a middle-office comprising of, say, twelve professionals and a back-office of similar numbers. The agent could take over these functions and automate them as much as possible. The clients would then be able to focus on their core activities, e.g. proprietary trading for the hedge funds and client derivatives and securities sales and trading for the investment bank, and the strategic aspects of the financial function, e.g. minimum liquidity requirements during both normal and abnormal or crisis market conditions, while leaving the agent to focus on the day-to-day running of the operation.

Tokai Bank Europe plc ("TBE") is a typical example of a medium size financial trading firm, regulated by the Financial Services Authority ("FSA") of the United Kingdom, which possess a hedge fund type proprietary trading business, a client capital markets business, and middle- and back-office support functions of approximately the size described above. Even if an agent could demonstrate that it could run TBE's treasury function, together with the entire middle- and back-office support functions for the two front-office activities, more efficiently and at lower cost, TBE would be unlikely to outsource such functions (and/or the FSA may find it difficult to allow it) unless the agent is able to demonstrate that the activities of the agent could be made sufficiently transparent for TBE's management to at least maintain (or improve) its strategic control of the functions.

The agent might provide the client with the ability to remotely access and/or monitor, on the client's computer screen, in real-time and/or near-real-time, the risk management information being generated and how the agent is reacting to that risk management information. The analysis of risk management information and/or instructions/recommendations to the client can be provided by the agent over a network, such as via a Web site, on any desired basis, such as hourly, daily, and/or weekly.

Risk committees, credit committees, and new product committees can be conducted by the agent on behalf of the client and the client can be encouraged by the agent to participate in such committees over a network. Financial regulators encourage trading operations of regulated firms to set up such committees, which are typically designed to analyze systematically every aspect of new market risk positions, credit applications and/or new product applications made by the front-office teams. For regulated clients, their financial regulators might require that, at minimum, the agent sets up all the procedures and frameworks expected and/or demanded from the client. For example, the agent might implement different levels of access and security of its own front-, middle- and back-office staff that are acting on behalf of clients, and further comply with specific procedures for regulated clients which might be specified by the regulators of such clients.

As an example of the extent that the communication between the agent and the client could be automated, computer models can be made to dial telephone numbers when pre-specified positions or risk levels are reached or whenever market risk indicators exceed given levels in order to warn both the agent and the client that some action might be necessary if the markets move further. The system might also provide "buy/sell buttons" for the agent and/or the client to take corrective action if they wished to do so by implementing actions automatically and/or electronically based on the financial information. In certain markets, such "buttons" can provide an advantage for the agent and the client by improving the speed at which actions can be implemented following the analysis of new information. As another example, the technology could alert both the agent and the client that a particular cash balance will be transferred to another eligible bank counterparty, which has announced a better rate, and provide a "stop transfer button" for the client to halt the transfer and/or replace by an alternative action if the client wishes to do so. The agent can implement actions on behalf of the client unless the client via the network halts the actions and/or removes the agent's authority to take actions on his behalf.

The above description is equivalent to passive trading execution where the agent follows the client's financial guideline and benchmark on a best efforts basis and for a flat fee. The method of the present invention will also allow this passive method to be extended to active trading by allowing the agent to trade at its own discretion on behalf of the client within the risk limits provided by the client. For example:

1. hedging with off-the-run Treasuries by the agent rather than the more liquid on-the-run Treasuries could be regarded as an exercise of discretion by the agent in the trading execution and therefore still treated as passive trading;
2. extending the duration of a short-term debt portfolio from, say, 3 months to 9 months in anticipation of higher interest rates would be regarded as discretionary trading and therefore treated as active debt management;
3. funding through the repo market (i.e. the simultaneous sale and forward purchase of a government bond in order to raise short-term funds secured by the security being lent) and stock lending (i.e. the lending of a security to a counterparty that wishes to short (i.e. sell) the same security which he does not own) are also activities that could be treated as discretionary and therefore part of active trading, although a sophisticated client might wish to regard these activities as part of the passive management function.

In cases where the agent engages in active trading on behalf of clients, the agent might receive an out-performance fee. An example of an out-performance fee might be 20% of the funding costs savings relative to the benchmark funding costs of, say, LIBOR—5 basis points. In this example, if the agent achieves average funding costs over the evaluation period of, say, LIBOR—30 basis points, it will receive an out-performance fee of 5 basis points (=20% of 0.0025%). The agent can be a regulated entity in its own right, particularly if the clients of the agent include many regulated clients, and might therefore need to comply with further regulatory guidelines and procedures. The internal framework and procedures used by the agent to allocate block trades among multiple clients and to manage conflicts of interests might be closely examined by the agent's regulators who might introduce additional requirements in cases where the agent receives an out-performance fees in connection with discretionary trading activities on behalf of clients. The ability to carry out the above functions for multiple clients with different financial objectives and guidelines at a cost lower than the sum of the costs of the agent incurred in respect of each client in order to assume the financial functions being outsourced, constitutes one potential advantage of embodiments of the present invention.

Exemplary Utilization: Asset and Liability Management ("ALM")

Another exemplary utilization of an embodiment of the present invention involves asset and liability management ("ALM"), which, when restricted to pure financial assets and liabilities, extends short-term cash management and funding to medium- (between 1 year and 3 years) and long-term (over 3 year) transactions. Treasury operations of financial firms and some larger corporate, combine ALM with the short-term funding and cash management. ALM typically involves interest rate and/or currency swaps and long-term options on bonds and/or swaps, which could be regarded as more complex (than the short-term money market instruments of the short-term cash management and funding function described above) since their cashflows and other contract terms are sometimes customized to the client's needs. For example, there might be credit mitigation arrangements, such as different types of collateral or mark-to-market provisions, which reduce the credit exposure (e.g. by either requesting the posting of further collateral, or by changing the terms of the transaction without altering the net economic effect) at regular intervals or whenever the exposure exceeds trigger levels specified up-front.

Thus the provision of ALM by an agent to a client might include a collateral management system, and/or counterparty exposure and limit utilization system for derivatives. Typical ALM financial guidelines, benchmarks and risk limits can include:

1. the matching all assets and liabilities, allowing for mismatches which generate a value-at-risk less than, say, $x million over a 30-day period. (e.g. Abbey National plc's treasury might express some financial guidelines and risk limits in this manner);
2. the maintaining of a target duration and currency composition for a net long-term debt portfolio, allowing deviations within specified ranges expressed in percentage terms. (e.g. an approach could be appropriate for BP Finance or for the Swedish Debt Office); and/or
3. the selection of the debt portfolio's fixed-floating mix so as to match the duration of the cashflows from operations, estimated/calculated by the client and communicate to the agent within the financial information. For example, the cashflows from operations might result from auto leases whose pre-payment rates are assumed not linked to the levels of interest rates. Such cashflow from operations might provide the basis for determining a benchmark around which the debt portfolio is managed within either value-at-risk limits or duration ranges. Toyota Motor Credit Corporation ("TMCC") might be an example of such an operation.

ALM can also be extended to cases where the behavior of either the assets or the liabilities arising from operational cashflows can be approximately matched by the other side. Typical ALM financial guidelines, benchmarks and risk limits in these cases might include:

1. the matching of potential the complex option-like behavior that might result from a portfolio of fixed rate home loans whose pre-payments rates are linked to the prevailing levels of interest rates by embedding and/or replicating such behavior within the debt portfolio. The ALM benchmark in this case might be a complex liability portfolio;
2. the approximate matching of pension claims for an aging population with an asset portfolio comprising equities, fixed income and cash. The ALM benchmark for such a portfolio might start as a pure equity asset portfolio and gradually increase the proportion of fixed income and cash as the population ages. Value-at-risk limits could be defined around this dynamic benchmark;
3. the approximate matching by an asset portfolio of the behavior of a portfolio of insurance claims triggered by prolonged cold weather in a particular region. This example could apply to a local government authority whose outflows exceed inflows at times of prolonged cold weather because of the higher costs of clearing roads and additions social security related payments. The ALM benchmark for the asset portfolio might include insurance derivatives and/or stocks whose price has historically benefited from prolong weather periods such as natural gas producers. Value-at-risk limits might be the most appropriate way of measuring the risk of deviating from such a benchmark; and/or 4. the selection of the duration and currency composition of a foreign reserves asset portfolio by a central bank of a developing country so as to approximately match the characteristics of the demand for reserves. For example, the benchmark currency composition might be set to approximately match the currency of denomination and/or the geographical distribution of imports combined with foreign debt service payments, while the benchmark duration might be set by reference to the level of reserves. ALM risk limits in this case might be set either in terms of duration and currency ranges or in terms of value-at-risk, while performance might be measured by reference to the above benchmark duration and currency composition created by customizing government bond and money market indices.

Exemplary Utilization: Credit Management

Another exemplary utilization of an embodiment of the present invention involves credit management, which can involve the management of credit exposures arising from:

1. bonds and money market instruments issued by corporates, financial institutions, and/or governments not regarded as credit risk free. The credit exposure of such instruments is given by their market value;
2. counterparty exposure on derivatives, which measures the loss that might result from the default of the counterpary of the derivative before the expire of the contract in circumstances where the value of the derivative is negative for the counterparty;
3. credit derivatives, which are derivatives contracts with a counterpary where, provided that certain conditions are fulfilled, the value of the contract might be linked to the credit of a third party. The credit exposure generated by these financial instruments can be a complex portfolio of exposures to both bond issuers and counterparties as defined above;
4. lending to third parties in secured and/or unsecured form; and/or
5. counterparty exposure for securities trading, which measures the loss that can result from the default of the counterparty of a security sale or purchase before the settlement of the trade in circumstances where the price of the security has moved against the counterparty over this relatively short period of time before settlement. The credit exposure here depends only on the likelihood and magnitude of price changes over such a short time period and therefore it is considerable smaller, than the exposures generated by the above other four credit activities.

Some of the above credit activities, by themselves, can be regarded as financial functions. However, the combination of all the above activities can also be regarded as a financial function. For example, if the client is a either a development bank (e.g. the Development Bank of Japan) or a commercial bank (e.g. the Bank of Nova Scotia), lending exposures can be evaluated and managed by the credit department, and the results of this loan management function can be communicated to the treasury function (and/or directly to the agent providing the treasury function) and conversely, particularly in circumstances where there is an overlap or correlation between the credit of the borrowers and that of the bond holdings and/or derivatives counterparties of the treasury function.

Typical credit financial guidelines and benchmarks can be constructed from historical default probabilities and/or credit spreads. Risk limits can then be defined in terms of credit value-at-risk, which quantifies the worst case, e.g. the 5% worst outcomes where credit losses through defaults exceed the expected default losses. Risk limits can also be defined in more simple terms as the maximum amounts permissible for each credit and/or each credit rating class where the latter might be split by country and/or industry.

Credit risk management might include, in addition to the evaluation of stand-alone exposures, the evaluation of incremental and marginal exposures of transactions, counterparties and/or netting agreements. The incremental exposure shows the net effect on the total portfolio exposure of adding a new exposure, while the marginal exposure shows the net effect of removing form the portfolio a particular transaction, counterparty and/or netting agreement.

Credit risk management might also include the estimation of the impact of individual transactions on the expected portfolio credit losses. By combining the expected exposure (calculated by statistical simulation in the case of derivatives) with default probabilities (implied by market prices and/or obtained from historical data), the expected credit default losses and hence reserves can be estimated. Credit value-at-risk then estimates the additional losses likely to be incurred in the 5% (or 1%) worst scenarios based on the historical data used to provide estimates of the likelihood of changes in the default probabilities of different credits and their correlations.

The above activities can be regarded primarily as middle-office type functions. However, sophisticated investment banks (e.g. JP Morgan) are able to combine their front-office credit spread trading functions with the above type of middle-office credit risk management function into a single combined credit management function. To achieve this type of integration, certain embodiments of the present invention might construct, calibrate and store credit curves for every borrower, issuer and derivative counterparty by calibrating to market prices of liquid fixed and floating bonds or credit default swaps, and then to use the credit rating classes to map such borrowers, issuers and/or counterparties onto sets of generic credit rating curves (such as those provided by credit rating agencies). Alternatively, default probabilities might be allocated directly to those illiquid loan-type exposures, where only historic default data is available.

Embodiments of the present invention will therefore give the agent the ability to price each credit exposure on a stand-alone basis, as well as on an incremental and/or marginal basis as defined above. The ability to price, risk manage and/or hedge credit, can enable the agent to trade credits (in the form of loan and/or bond sales and credit derivatives transactions) with third parties on behalf the client. This ability can also be an important ingredient for the credit risk management of credit trading portfolios which include credit derivatives, as these instruments generate two exposures: to the counterparty and to the issuer of the underlying reference security. Therefore, in order to evaluate the credit exposure and risk on such instruments it is necessary to have an integrated approach for the management of these two types of exposures, which only specialized financial services firms and sophisticated investment bank might posses. Embodiments of the present invention can allow the agent to make such approach available to clients and, in particular, to those that could not justify the necessary investment in software, hardware and, most importantly, technical know-how, that would be required to acquire such integrated approach.

Further, the ability of the agent to, for example, exchange credits on behalf of the client in areas where the client is over exposed, with credits where which have a lower correlation with the other credits of the client, might result in a reduction of the overall credit risk for the client (even in cases where the stand-alone credit risk of the credits being exchanged is the same or even greater) by taking advantage of portfolio diversification effects. This combined credit management function, which up to now could only be practiced by the very sophisticated investment banks, might be made available to a plurality of less sophisticated financial clients by the agent acting on their behalf, and this is another important benefit of embodiments of the present invention.

Exemplary Utilization: Combined Market and Credit Management

Yet another exemplary utilization of an embodiment of the present invention is the combined management of market and credit. This might be done by modeling both credit and market exposures on a consistent basis within the same framework and by taking into account the correlation between FX and interest rates (and also electricity prices, weather and/or legal insurance costs, and/or commodity prices, if applicable) and default probabilities.

For example, the defaults of foreign currency liabilities might be strongly linked to the weakness of the domestic currency of a counterparty (of the client) from a developing country. Thus a cross-currency swap in which such counterparty receives its own domestic currency and pays the foreign currency might be treated by the client as an un-collateralized foreign currency loan in the event of devaluation of the counterparty's domestic currency.

Similar examples can be provided involving traded commodity prices, oil and/or electricity prices, weather and/or legal insurance costs. For example, a treasury operation of a firm such as Pemex of Mexico, might be exposed to the following: a devaluation of the domestic currency against the US Dollar; higher foreign interest rates on its debt portfolio; swap counterparty credit exposures on its FX, interest rates and commodity derivatives; oil prices; natural gas prices in their regulated domestic market which might be linked to factors such as the weather and electricity prices; and/or pollution damage legal claims which might in turn have links to the level of their oil and natural gas production. Although Pemex is a relatively very large firm, it might be difficult for them to justify the investment of resources that would be required for the combined management of these exposures using the available state-of-the art models and techniques. In contrast, the agent might be able to justify such investment if it can provide these services to a plurality of clients.

Thus, the rate at which financial risk management and trading technology is being developed combined with the large choice available to end-users might result in many such end-users not being able to justify the investment (in terms of know-how, rather than costs since the latter appear to be constantly falling) in acquiring it. An important benefit of certain embodiments of the present intention is to bring the benefits of such state-of-the-art technology to such end-user clients by an agent.

Advantages

There are numerous advantages to various embodiments of the disclosed invention. For a client, outsourcing the risk management and trading of a financial function can allow the client to:
1. Focus on its core business and on the strategic aspects of the financial functions being outsourced without diverting valuable resources to their day-to-day operation;
2. Improve the management of the financial functions by receiving relevant information only, together with analyses of the information performed by external risk management and trading professionals;
3. Reduce costs;
4. Reduce operational risks;
5. Create value through more efficient trading execution;
6. Out-perform the benchmark by giving trading discretion to the agent within the risk limits; and/or
7. Maintain the desired level of control over the financial function by making use of the transparent communication facilities provided by the agent.

For an agent, the providing financial functions for a plurality of clients can allow the agent to:
1. Automate the functions by communicating with exchanges and counterparties electronically, thus gaining timing advantages in the execution of trades;
2. Reduce transaction costs by amalgamating trades on behalf of several clients;
3. Reduce operational costs through economies of scale;
4. Insure against operational risk at a lower cost because of the diversification benefits of performing functions for different clients; and/or
5. Gain the confidence of the client and reduce the potential legal liability by providing real-time or near-real-time transparency and historical actions reviews and audit trails.

Still other advantages of embodiments of the present invention will become readily apparent to those skilled in this art from the above-recited detailed description and the accompanying drawings. Accordingly, the drawings and descriptions provided herein and herewith are to be regarded as illustrative in nature, and not as restrictive.

What is claimed is:

1. A computer-assisted method comprising:
   relating to each of a plurality of clients of an agent:
      demonstrating, to the client, that a plurality of credit management activities of the agent on behalf of the client are securely, continuously, and transparently monitorable by the client across a packet-switched public network via a network-based user interface;
      performing, by the agent, the plurality of credit management activities on behalf of the client, the plurality of credit management activities comprising:
         causing execution of trades and hedges, said execution adapted to be halted by the client across the packet-switched public network via the network-based user interface;
      automatically recording a verifiable audit trail of the plurality of credit management activities performed by the agent on behalf of the client, the audit trail securely, continuously, and transparently examinable by the client across the packet-switched public network via the network-based user interface; and
      securely, continuously, transparently, and automatically communicating the plurality of credit management activities of the agent to the client across the packet-switched public network via the network-based user interface.

2. A computer-assisted method, comprising:
   over a networked computerized system:
      receiving a demonstration, by an agent, that a plurality of financial function activities performed by the agent on behalf of a client are securely, continuously, and transparently monitorable by the client across a packet-switched public network via a network-based user interface;
      securely, continuously, and transparently monitoring the plurality of financial function activities performed by the agent;
      monitoring an audit trail of the plurality of financial function activities performed by the agent; the audit trail automatically recorded, verifiable, and securely, continuously, and transparently examinable by the client across the packet-switched public network via the network-based user interface; and interceding in at least one of the plurality of financial function activities performed by the agent.

3. The method of claim 2, further comprising:
receiving information regarding at least one of the plurality of financial function activities.

4. The method of claim 2, further comprising:
providing feedback regarding at least one of the plurality of financial function activities.

5. The method of claim 2, wherein:
the monitoring of the plurality of financial function activities is performed in real-time.

6. The method of claim 2, wherein:
the monitoring of the plurality of financial function activities is performed in near real-time.

7. A networked computerized system adapted to allow a client to:
receive a demonstration, by an agent, that a plurality of financial function activities performed by the agent on behalf of the client are securely, continuously, and transparently monitorable by the client across a packet-switched public network via a network-based user interface;
securely, continuously, and transparently monitor the plurality of financial function activities performed by the agent;
monitor an audit trail of the plurality of financial management activities performed by the agent, the audit trail automatically recorded, verifiable, and securely, continuously, and transparently examinable by the client across the packet-switched public network via the network-based user interface; and
intercede in at least one of the plurality of financial function activities performed by the agent.

8. A computer-readable medium comprising computer-implementable instructions for activities comprising:
over a networked computerized system:
receiving a demonstration, by an agent, that a plurality of financial function activities performed by the agent on behalf of the client are securely, continuously, and transparently monitorable by the client across a packet-switched public network via a network-based user interface;
securely, continuously, and transparently monitoring the plurality of financial function activities performed by the agent;
monitoring an audit trail of the plurality of financial function activities performed by the agent, the audit trail automatically recorded, verifiable, and securely, continuously, and transparently examinable by the client across the packet-switched public network via the network-based user interface; and
interceding in at least one of the plurality of financial function activities performed by the agent.

9. A computer-assisted method, comprising:
via a networked computerized system:
permitting secure, continuous, and transparent monitoring by a client of each of a plurality of financial function activities performed by an agent;
creating an audit trail of the plurality of financial function activities performed by the agent, the audit trail automatically recorded, verifiable, and securely, continuously, and transparently examinable by the client across the packet-switched public network via the network-based user interface; and
allowing the client to halt the agent from performing at least one of the plurality of financial function activities.

10. The method of claim 9, further comprising:
reporting, to the client, a reason behind a decision to perform at least one of the plurality of financial function activities.

11. The method of claim 9, wherein:
the transmitting is performed automatically.

12. A networked computerized system adapted to allow an agent to:
permit secure, continuous, and transparent monitoring by a client of each of a plurality of financial function activities performed by an agent;
create an audit trail of the plurality of financial function activities performed by the agent, the audit trail automatically recorded, verifiable, and securely, continuously, and transparently examinable by the client across the packet-switched public network via the network-based user interface; and
allow the client to halt the agent from performing at least one of the plurality of financial function activities.

13. A computer-readable medium storing computer-implementable instructions, wherein when implemented by a computer performs the method comprising: over a networked computerized system:
permitting secure, continuous, and transparent monitoring by a client of each of a plurality of financial function activities performed by an agent;
creating an audit trail of the plurality of financial function activities performed by the agent, the audit trail automatically recorded, verifiable, and securely, continuously, and transparently examinable by the client across, the packet-switched public network via the network-based user interface; and
allowing the client to halt the agent from performing at least one of the plurality of financial function activities.

14. A computer-assisted method, comprising:
over a networked computerized system:
demonstrating that a plurality of financial function activities performed by an agent on behalf of a client are securely, continuously, and transparently monitorable by the client across a packet-switched public network via a network-based user interface;
securely, continuously, and transparently transmitting to the client information regarding each of the plurality of financial function activities performed by the agent;
providing access to the client to an audit trail of the plurality of financial function activities performed by the agent, the audit trail automatically recorded, verifiable, and securely, continuously, and transparently examinable by the client across the packet-switched public network via the network-based user interface; and
being halted by the client from performing at least one of the plurality of financial function activities.

15. A networked computerized system adapted to allow an agent to:
demonstrate that a plurality of financial function activities performed by the agent on behalf of a client are securely, continuously, and transparently monitorable by the client across a packet-switched public network via a network-based user interface;
securely, continuously, and transparently transmit to a client information regarding each of a plurality of financial function activities performed by the agent;
provide access to the client to an audit trail of the plurality of financial function activities performed by the agent, the audit trail automatically recorded, verifiable, and securely, continuously, and transparently examinable by the client across the packet-switched public network via the network-based user interface; and be halted by the client from performing at least one of the plurality of financial function activities.

16. A computer-readable medium storing computer-implementable instructions, wherein when executed by a computer performs the method comprising:

over a networked computerized system:
demonstrating that a plurality of financial function activities performed by an agent on behalf of a client are securely, continuously, and transparently monitorable by the client across a packet-switched public network via a network-based user interface;

securely, continuously, and transparently transmitting to a client information regarding each of a plurality of financial function activities performed by the agent;

providing access to the client to an audit trail of the plurality of financial function activities performed by the agent, the audit trail automatically-recorded, verifiable, and securely, continuously, and transparently examinable by the client across the packet-switched public network via the network-based user interface; and being halted by the client from performing at least one of the plurality of financial function activities.

17. A computer-assisted method comprising:
relating to each of a plurality of clients of an agent:
demonstrating, to the client, that a plurality of short-term funding and cash management activities of the agent on behalf of the client are securely, continuously, and transparently monitorable by the client across a packet-switched public network via a network-based user interface;

performing, by the agent, the plurality of short-term funding and cash management activities on behalf of the client, the plurality of short-term funding and cash management activities comprising:
causing execution of trades and hedges, said execution adapted to be halted by the client across the packet-switched public network via the network-based user interface;

automatically recording a verifiable audit trail of the plurality of short-term funding and cash management activities performed by the agent on behalf of the client, the audit trail securely, continuously, and transparently examinable by the client across the packet-switched public network via the network-based user interface; and securely, continuously, transparently, and automatically communicating the plurality of short-term funding and cash management activities of the agent to the client across the packet-switched public network via the network-based user interface.

18. A computer-assisted method comprising:
relating to each of a plurality of clients of an agent:
demonstrating, to the client, that a plurality of asset and liability management activities of the agent on behalf of the client are securely, continuously, and transparently monitorable by the client across a packet-switched public network via a network-based user interface;

performing, by the agent, the plurality of asset and liability management activities on behalf of the client, the plurality of asset and liability management activities comprising:
causing execution of trades and hedges, said execution adapted to be halted by the client across the packet-switched public network via the network-based user interface;

automatically recording a verifiable audit trail of the plurality of asset and liability management activities performed by the agent on behalf of the client, the audit trail securely, continuously, and transparently examinable by the client across the packet-switched public network via the network-based user interface; and securely, continuously, transparently, and automatically communicating the plurality of asset and liability management activities of the agent to the client across the packet-switched public network via the network-based user interface.

19. A computer-assisted method comprising:
relating to each of a plurality of clients of an agent:
demonstrating, to the client, that a plurality of market risk management activities of the agent on behalf of the client are securely, continuously, and transparently monitorable by the client across a packet-switched public network via a network-based user interface;

performing, by the agent, the plurality of market risk management activities on behalf of the client, the plurality of market risk management activities comprising:
causing execution of trades and hedges, said execution adapted to be halted by the client across the packet-switched public network via the network-based user interface;

automatically recording a verifiable audit trail of the plurality of market risk management activities performed by the agent on behalf of the client, the audit trail securely, continuously, and transparently examinable by the client across the packet-switched public network via the network-based user interface; and securely, continuously, transparently, and automatically communicating the plurality of market risk management activities of the agent to the client across the packet-switched public network via the network-based user interface.

20. A computer-assisted method comprising:
relating to each of a plurality of clients of an agent:
demonstrating, to the client, that a plurality of financial function activities of the agent on behalf of the client are securely, continuously, and transparently monitorable by the client across a packet-switched public network via a network-based user interface;

performing, by the agent, the plurality of financial function activities on behalf of the client, the plurality of financial function activities comprising:
causing execution of trades and hedges, said execution adapted to be halted by the client across the packet-switched public network via the network-based user interface;

automatically recording a verifiable audit trail of the plurality of financial function activities performed by the agent on behalf of the client, the audit trail securely, continuously, and transparently examinable by the client across the packet-switched public network via the network-based user interface; and securely, continuously, transparently, and automatically communicating the plurality of financial function activities of the agent to the client across the packet-switched public network via the network-based user interface.

\* \* \* \* \*